United States Patent [19]
Greidanus et al.

[11] Patent Number: 5,371,721
[45] Date of Patent: Dec. 6, 1994

[54] METHOD AND APPARATUS FOR WRITING AND READING A MAGNETO-OPTICAL RECORD CARRIER

[75] Inventors: Franciscus J. A. M. Greidanus, Yorktown Heights, N.Y.; Johannes H. M. Spruit; Bernardus A. J. Jacobs, both of Eindhoven, Netherlands

[73] Assignee: U.S. Philips Corporation, New York, N.Y.

[21] Appl. No.: 998,898

[22] Filed: Dec. 28, 1992

Related U.S. Application Data

[63] Continuation of Ser. No. 556,930, Jul. 19, 1990, abandoned.

[30] Foreign Application Priority Data

Nov. 6, 1989 [NL] Netherlands ............ 8902728

[51] Int. Cl.$^5$ ............................................. G11B 13/04
[52] U.S. Cl. ............................ 369/13; 360/114
[58] Field of Search ............... 369/13; 360/59, 114, 360/60, 66; 365/122

[56] References Cited

U.S. PATENT DOCUMENTS

| | | | |
|---|---|---|---|
| 4,466,004 | 8/1984 | Kobayashi et al. | 346/74.4 |
| 4,998,231 | 3/1991 | Watanabe et al. | 369/13 |
| 5,014,253 | 5/1991 | Morimoto et al. | 369/13 |
| 5,014,254 | 5/1991 | Van Rosmalen et al. | 369/13 |
| 5,163,031 | 11/1992 | Osato | 360/114 |

FOREIGN PATENT DOCUMENTS

| | | | |
|---|---|---|---|
| 0230325 | 7/1987 | European Pat. Off. | |
| 0275323 | 7/1988 | European Pat. Off. | 369/13 |
| 0312143 | 4/1989 | European Pat. Off. | |
| 0327315 | 8/1989 | European Pat. Off. | 369/13 |
| 61-190742 | 8/1986 | Japan | |

OTHER PUBLICATIONS

Greindanus, Zeper, den Broeder, Godlieb and Carcia, Thermomagnetic Writing In Thin Co/Pt Layered Structures, Appl. Phys. Let. 54(24), Jun. 12, 1989, pp. 2481-2483.

Shieh and Kryder, Magneto-Optic Recording Materials With Direct Overwrite Capability, Appl. Phys. Lett. 49(8), Aug. 25, 1986, pp. 473-474.

Hartmann, Jacobs and Braat, Erasable Magneto-Optical Recording, Philips Technical Review vol. 42, No. 2, Aug. 1985, pp. 37-47.

*Primary Examiner*—Hoa T. Nguyen
*Attorney, Agent, or Firm*—Leroy Eason

[57] ABSTRACT

A method and apparatus for writing and reading information in the form of a pattern of magnetic domains in an information layer of a record carrier. An optical scanning beam is focused to a diffraction-limited radiation spot, and a magnetic field is generated by a coil supplied with an energizing current the amplitude of which is modulated by the information signal to be recorded. The magnetic field is thereby modulated, and produces magnetic domains in the information layer such that each domain has a variable number of subdomains and consequently a variable magnetization ratio, as determined by the information signal. This permits recording at an information density exceeding that corresponding to the size of the radiation spot.

28 Claims, 9 Drawing Sheets

METHOD AND APPARATUS FOR WRITING AND READING A MAGNETO-OPTICAL RECORD CARRIER

This is a continuation of application Ser. No. 07/556,930, filed Jul. 19, 1990, now abandoned.

BACKGROUND OF THE INVENTION

The invention relates to a method of optically writing and reading information in the form of a pattern of magnetic domains in an information layer of a record carrier. An optical scanning beam is focused to a radiation spot and during writing the portions of the information layer heated by the radiation spot are subjected to the influence of a magnetic field which is directed substantially perpendicularly to the information layer, which field is generated by means of a coil through which an energizing current is passed, so that said domains are formed. During reading, the variation caused by the magnetic domains in the state of polarization of the scanning beam is detected.

The invention also relates to an apparatus for performing the method.

Such a method of recording information is known from U.S. Pat. No. 4,466,004, issued Aug. 14, 1984. Generally a laser beam, for example a diode laser beam, which is focused to a diffraction-limited radiation spot by means of an optical system, is used when inscribing a magneto-optical information layer. The original uninscribed information layer is premagnetized in a direction perpendicular to this layer. During writing the portion of the magneto-optical material at the location of the radiation spot is heated to a given temperature, for example, the Curie temperature, so that the coercive force is locally reduced. As a result, this portion can be magnetized by a relatively small external magnetic field in a desired direction perpendicular to the magnetic layer. After the relevant portion of the magneto-optical information layer has cooled down, the magnetic direction of the external magnetic field becomes frozen, as it were, into the information layer. By moving the radiation spot and the record carrier with respect to each other and by modulating the external magnetic field, a series of magnetic domains, or information areas, having a direction of magnetization deviating from their surroundings can be written in the information layer, the successive information areas in the direction of movement representing the inscribed information.

This method is known as the magnetic field modulation method. It is alternatively possible to inscribe magnetic domains by means of a constant external magnetic field and by modulating the intensity of the radiation beam in accordance with the information to be written. In this so-called radiation source modulation method the size of the information areas is determined by the size of the radiation spot. In known systems, in which the radiation spot has a half-value width of approximately 1 $\mu$m, the information areas are substantially circular with a diameter of the order of 1 $\mu$m. The information density is then of the order of $10^6$ bits per $mm^2$.

There is an ever increasing need for larger information densities so that more information can be stored in a record carrier of equal dimensions. To this end it must be possible to write and read information areas which are smaller than those hitherto used in a magneto-optical record carrier.

In said U.S. Pat. No. 4,466,004 it is proposed to provide information areas in the form of magnetic domains in a magneto-optical record carrier, which areas have a dimension in the scanning direction which is smaller than the dimension of the write-radiation spot, by switching the magnetic field at a high frequency. Firstly, the area of the information layer under the radiation spot is magnetized in a direction opposite to the original direction of magnetization of the information layer. Then, while the radiation spot is still partly above said area, the magnetic field is reversed so that said part of the area acquires the original direction of magnetization again. U.S. Pat. No. 4,466,004 does not state how the magnetic domains with their smaller dimension in the scanning direction thus obtained can be read.

Since each information bit is fixed in an information area, each information area must be read separately. This means that reading must be performed by means of a radiation spot whose dimension in the scanning direction is of the same order as the dimension of each of the information areas. The read-radiation spot must therefore be considerably smaller than the write-radiation spot.

An optical scanning system in which radiation at a given wavelength, $\lambda$, and an objective lens having a given numerical aperture, NA, are used, has an optical cut-off frequency $f_{co}$ which is proportional to $2.NA/\lambda$, i.e. inversely proportional to the size of the scanning spot. Such a system can no longer separately observe details of an object, in this case the information areas in the information layer, if the mutual distance between these details or areas is equal to or smaller than $2.NA/\lambda$. Thus, a given spatial frequency $f_r$ of the information areas is associated with this optical cut-off frequency.

Since the size of the diffraction-limited radiation spot is proportional to $\lambda/NA$, in which $\lambda$ is the wavelength of the radiation used and NA is the numerical aperture of the objective system used, the radiation spot can only be reduced by decreasing the wavelength and/or enlarging the numerical aperture. An enlargement of the numerical aperture involves a decrease of the depth of field of the radiation beam so that the requirements to be imposed on the focusing of the radiation beam become more stringent. Moreover, an objective system having a larger numerical aperture is more sensitive to aberrations so that stricter tolerance requirements must be imposed on the write-read apparatus. If a diode laser is to be maintained as a radiation source, which is necessary in a mass product which the magneto-optical write-read apparatus envisages to be, the reduction of the wavelength of the radiation beam is not a real possibility because there are no short-wavelength diode lasers which yield a sufficiently high power for writing.

SUMMARY OF THE INVENTION

The present invention provides a novel possibility of increasing the information density in a magneto-optical record carrier, in which the radiation spot need not be reduced. This novel possibility is realized by means of a novel method which is characterized in that, during writing, the amplitude of the energizing current is modulated in dependence upon the information signal to be written so that magnetic domains are produced which comprise sub-domains having dimensions which are considerably smaller than the size of the radiation spot, the number of sub-domains per domain and hence the magnetization ratio of the relevant domain being determined by the information signal.

The magnetization ratio of a domain is defined as the ratio between the total surface of the areas within the domain having a first direction of magnetization perpendicular to the information layer and the total surface of the areas within the domain having a second direction of magnetization which is opposed to the first direction of magnetization. This ratio determines the state of polarization of the scanning beam during read-out.

The invention is based on the recognition that by producing a relatively large variation of the strength of the external magnetic field magnetic domains will be written which change the state of polarization of a read beam to different extents, and hence represent different signal values of the information signal. More information can therefore be written per domain. Use is made of the effect, which has hitherto not been used in magneto-optical recording, that when varying the external magnetic field strength from a given negative value to a given positive value, more and more sub-domains with a direction of magnetization opposed to the original direction of magnetization are produced in the area of a domain until the relevant area is entirely filled with sub-domains. During reading the variation of the number of sub-domains per domain causes a variation of the polarization modulation of the read beam issuing from the information layer and passing through an objective system, and hence a variation of the intensity of the radiation received by the radiation-sensitive detection system. This detection system then supplies an electric signal which is modulated in accordance with the inscribed information. The sub-domains within a domain, which sub-domains are not separately detected, jointly determine the intensity of the radiation beam issuing from this domain and received by the detection system. As it were, different grey levels are now written and read, with each grey level representing a given information signal value, instead of a black-white structure as has hitherto been conventional.

It is to be noted that it is known per se from published European Patent Application no. 0.284,056 to write several different signal values in a magneto-optical information layer so as to increase the information density. In accordance with the known method, however, the intensity of the write beam is varied so that the level within the information layer, at which the material is heated above the Curie point and the direction of magnetization can be reversed, is also varied. This requires use of a relatively thick information layer, and the radiation beam must have a high intensity. Moreover, such a thermal process is difficult to control due to its thermal diffusion. In accordance with the method described in such European Patent Application the written information areas are detected individually.

The method according to the invention may be performed with various magnetic materials as an information layer. However, the method is preferably further characterized in that a magnetic material whose compensation temperature is considerably lower than the Curie temperature is used for the information layer.

These materials generally comprise rare earth transition metals and are structured in accordance with two sub-lattices having an opposite magnetization. The compensation point is the point on the temperature scale at which the absolute values of the magnetizations associated with the two sub-lattices are equal, while the Curie point is the point on the temperature scale for which both magnetizations are zero. According as the compensation point further departs from the Curie point, there is less risk that the domain walls will be in motion during the formation of the magnetic domains and that consequently the walls of the domains formed will not be well-defined and so cause noise to be produced upon subsequent reading. For magnetic materials having a compensation temperature above the Curie temperature the signal-to-noise ratio is satisfactory even for domains which have been inscribed at a small magnetic field strength. These materials also have a satisfactory linear relationship between the strength of the magnetic field applied and the number of sub-domains per domain, or the grey value.

A material which is optimal as regards said linear relationship as well as the signal-to-noise ratio is constituted by an alloy of terbium, iron and cobalt. The compensation point of this material is determined by the ratio between terbium on the one hand and iron-cobalt on the other hand, while the Curie point is determined by the ratio between iron and cobalt.

Satisfactory results can alternatively be achieved when using a multi-layer structure of cobalt-platinum as an information layer. The use of such a multi-layer structure for magneto-optical information storage is described in general in, for example, "Applied Physics Letters", 54, (1989), page 2481.

The above-described method according to the invention may be further characterized in that the amplitude of the energizing current is continuously modulated in accordance with the value of the signal to be written. Thus, the signal is written in the information layer in analog form.

The method according to the invention is, however, preferably characterized in that the amplitude of the energizing current is varied in n discrete steps, in which n is an integer greater than two. The information signal is now recorded, as it were, in n different grey levels. If n=8, i.e. for producing eight grey levels on the record carrier, use can be made of an encoding which in addition to the values "1" and "0" also uses 1/7, 2/7, 3/7, 4/7, 5/7 and 6/7.

A first, preferably used, main embodiment of the above-mentioned method is characterized in that domains are written which adjoin each other in the scanning direction without the interposition of intermediate areas.

The entire path traversed by the scanning spot on the information layer is therefore provided with new information, so that a record carrier which has already been inscribed can be directly overwritten without first having to be erased.

A second main embodiment of the method is characterized in that magnetic domains are written which are separated from each other.

The first embodiment of the method may further be characterized in that use is made of a square-wave energizing current so as to fix the positions of the magnetic domains, which current has a first level located above a limit value at which magnetic domains having the first direction of magnetization are written and a second level below this limit value, the first level being varied in accordance with the desired magnetization ratio of said magnetic domains.

The second level may be such that the magnetic field is insufficiently strong for writing magnetic domains. In that case only a record carrier whose information layer is entirely premagnetized in a direction opposite to the first direction of magnetization can be written.

However, said first embodiment of the method is preferably also characterized in that the second level is located below a second limit value at which magnetic domains having a direction of magnetization which is opposite to the first direction of magnetization are written.

A record carrier which has already been inscribed can then be directly overwritten without first having to be erased.

The first embodiment may be further characterized in that use is made of a radiation beam having a constant intensity.

With this embodiment it is achieved in the simplest manner that the information layer is always sufficiently heated locally for writing a domain.

Alternatively, the first embodiment may be further characterized in that use is made of a pulsed radiation beam. By supplying the radiation energy in a pulsed manner, the temperature gradient at the boundary region of a magnetic domain to be formed is very high, so that the accuracy with which the boundaries of the magnetic domain are fixed is great. When reading the pattern of magnetic domains, this results in an improved signal-to-noise ratio, notably at high write speeds. A further advantage is that the thermal load of the information layer and hence the rate at which this layer ages is smaller than in the case of using a continuous radiation beam.

The method in which use is made of magnetic field modulation and a pulsed write beam is preferably further characterized in that a phase relation is maintained between the radiation pulses and the energizing current such that each radiation pulse does not end until the magnetic field has adjusted to a new final value. This ensures that the magnetic field is well-defined during local cooling of the information layer and that the domain formed has an optimum quality.

A second embodiment of the method according to the invention is characterized in that use is made of a radiation beam which is square-wave modulated so as to fix the positions of the magnetic domains. The positions of the magnetic domains are therefore fixed by the so-called radiation beam modulation, the energizing current being varied in amplitude only to vary the magnetization ratio of these domains.

A second aspect of the invention relates to the apparatus for performing the novel method. This apparatus comprises a radiation source for supplying a scanning beam, and an objective system for focusing the scanning beam to a radiation spot on the information layer. A radiation-sensitive detection system is used to convert the beam issuing from the information layer into an electric signal. A coil generates a magnetic field directed substantially perpendicularly to the information layer in the scanned portion of the information layer. A circuit for generating an energizing current in the coil, which current is modulated in dependence upon an information signal, comprises a controllable current source having a control input for receiving a signal which is proportional to the signal to be written and an output for supplying an energizing current whose amplitude varies in accordance with the signal to be written.

This apparatus may have different embodiments. A first, preferably used, main embodiment is characterized in that the energizing circuit is adapted to supply a current whose amplitude always is above a threshold value at which magnetic domains having the first direction of magnetization can be written. The magnetic field is now only varied so as to obtain the different magnetization ratio, no individual magnetic domains separated from each other being written. The tracks are magnetized in the first direction over their entire length and the information is recorded in the form of different magnetization ratios, or grey values, of the successive areas in tracks. A record carrier which has already been inscribed can then be re-inscribed immediately.

The first main embodiment may be further characterized in that the radiation source is adapted to supply a write-radiation beam having a constant intensity.

A second main embodiment of the apparatus is characterized in that the radiation source is adapted to supply a write-radiation beam whose intensity is square-wave modulated between a first level above a threshold value at which domains are formed, and a second level below the threshold value. When using radiation source modulation, individual magnetic domains which are separated from each other are then formed, the successive domains having different magnetization ratios. In order to achieve that these domains have well-defined edges and the desired direction of magnetization, the second main embodiment is characterized in that a synchronizing circuit is provided for maintaining a phase relation between the intensity variation of the write-radiation beam and the energizing current such that the transitions between the first and the second intensity level of the radiation beam substantially coincide with the instants at which the magnetic field has reached a new final value.

A third main embodiment of the apparatus is characterized in that the energizing circuit is adapted to supply a square-wave energizing current having a first variable level which is above the threshold value for writing magnetic domains having a first direction of magnetization and which therefore writes a variable magnetization ratio, and a second level below the threshold value. Individual magnetic domains which are separated from each other are then written using magnetic field modulation.

The third main embodiment of the apparatus may be further characterized in that the radiation source is adapted to supply a write-radiation beam having a constant intensity.

Alternatively, the third main embodiment may be characterized in that the radiation source is adapted to supply a pulsed write-radiation beam whose pulse duration is considerably shorter than half the pulse period.

A synchronizing circuit is preferably provided for maintaining a phase relation between the radiation pulses and the square-wave energizing current such that the end of each radiation pulse substantially coincides with the instant at which the magnetic field has reached a new final value.

BRIEF DESCRIPTION OF THE DRAWINGS

Embodiments of the invention will now be described in greater detail, by way of example, with reference to the accompanying drawings in which.

DETAILED DESCRIPTION OF THE PREFERRED EMBODIMENTS

Figure 1:
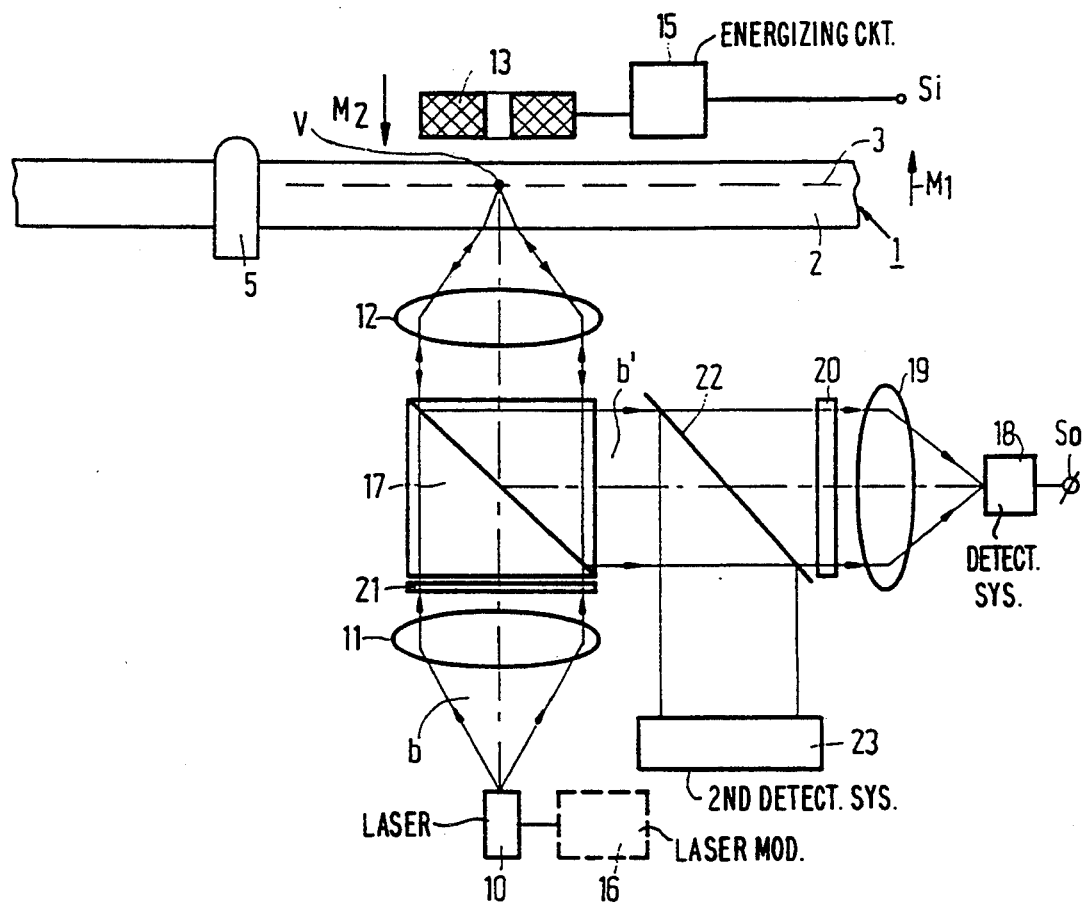
FIG. 1 shows an embodiment of a write-read apparatus for a magneto-optical record carrier.

In FIG. 1 the magneto-optical record carrier 1 comprises a transparent substrate 2 and a magnetic information layer 3. This information layer is irradiated by a radiation beam b which is supplied by a radiation source 10. This source is formed by a diode laser, for example, an AlGaAs laser emitting radiation at a wavelength of the order of, for example 800 nm. A part of the radiation emitted by the diode laser is captured by a collimator lens 11 and focused by an objective system 12, which is shown diagrammatically by means of a single lens, to a diffraction-limited scanning spot V having a half-value width of the order of 1 μm in the information plane.

Information areas in the form of magnetic domains are written in the layer 3 by controlling the diode laser in such a way that it emits a beam with a sufficiently high power, for example 5 mWatt, so as to heat the region on the information layer 3 at the location of the spot V to, for example, the Curie temperature and by modulating the magnetic field in accordance with the information signal $S_i$ to be written in. This signal is applied to an energizing circuit 15 which supplies an energizing current to a magnetizing coil 13. The magneto-optical layer 3 is, for example, premagnetized in a given direction indicated by the arrow $M_1$. By heating the layer 3 at the location of the radiation spot V, the coercive force at this location decreases and the direction of magnetization can be locally reversed by means of a relatively small external magnetic field generated by means of the magnetizing coil 13, in accordance with the arrow $M_2$ in FIG. 1. After the local supply of heat is terminated, for example, because the radiation spot has moved away, the material of the layer 3 cools down again and, as it was, the reversed direction $M_2$ of the magnetization becomes frozen.

Figure 2:
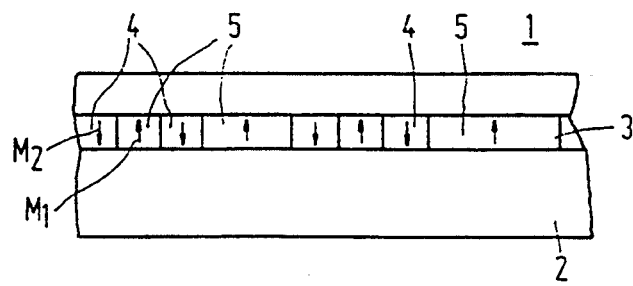
FIG. 2 shows in a cross-section a part of an information track written by a known method.

By moving the radiation spot V and the record carrier 1 with respect to each other, in the case of a round disc-shaped record carrier, for example, by rotating the record carrier around the shaft 5, a plurality of information areas can be successively written in the scanning direction so that a recorded information track is produced. FIG. 2 shows a small portion of such an information track in a cross-section. The areas of the information layer 3 where the direction of magnetization is reversed ($M_2$) are referred to as information areas 4, and the and the areas which have maintained the original direction of magnetization ($M_1$) are referred to as intermediate areas 5. Moreover, by moving the radiation spot V and the record carrier 1 with respect to each other in a direction perpendicular to the plane of the drawing in FIG. 1, in the case of a round disc-shaped record carrier in the radial direction, a plurality of tracks can successively be written side by side.

When reading the written information with the apparatus of FIG. 1, diode laser 10 is also used. However, is then operated at a considerably lower power, for example, ten times lower than during the writing operation, so that the stored information is not affected. The record carrier is preferably reflective, so that the beam as modulated by the information layer in accordance with the written information is reflected to the objective system 12. The radiation path incorporates a partly transmissive element, for example a 70% transmissive mirror or prism 17 which reflects a portion of the reflected modulated read beam b' to a radiation-sensitive detection system 18. In the embodiment of FIG. 1 a lens 19 for concentrating the radiation on the detection system 18 is arranged between the element 17 and this system.

Reading of the information layer is based on the change which the information areas, or domains, 4 cause in the state of polarization of the read beam. To detect this change, a polarization analyzer 20 is arranged in the radiation path in front of the detection system 18, which analyzer converts the polarization modulation into an intensity modulation which is converted by the detection system into an electric signal $S_0$. A polarizer 21 whose direction of polarization effectively extends at an angle of, for example 85° to that of the analyzer 20 may be arranged in the radiation path of the ongoing read beam b.

In order to be able to ascertain during reading whether the read spot is centered on the information track and/or whether the read beam is focused on the information plane, a partly transmissive mirror, for example, a 90% transmissive mirror or prism 22, may be arranged in the radiation path of the reflected beam b' to reflect a part of this beam to a second radiation-sensitive detection system 23. The electric signals supplied by this detection system are used by servo systems (not shown) to correct tracking and focusing. The tracking and focus-servo systems may also be used during writing, utilizing the portion of the write beam then reflected by the record carrier. For further details about writing and reading of a magneto-optical record carrier and about its arrangement, reference may be made to the article "Erasable Magneto-Optical Recording" in Philips' Technical Review, 42, no. 2, August 1985, pages 37–47.

Figure 3:
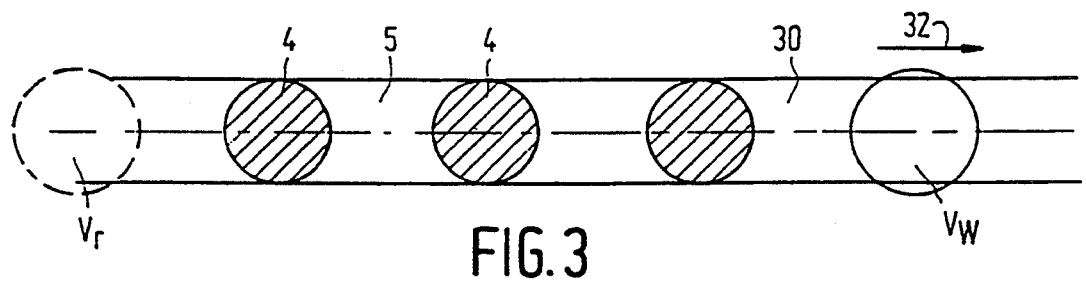
FIG. 3 shows the size of the information areas written by the known method relative to the size of the write and read spot used.

In the conventional method of magneto-optical recording, magnetic domains are written with a surface area of the order of magnitude of that of the radiation spot. FIG. 3 shows the write spot $V_w$ of a known magneto-optical apparatus and a plurality of information areas 4 written by means of this spot. The information areas are arranged along an information track 30. This track is only partly written. During writing, the write spot moves with respect to the information plane to the right in accordance with the arrow 32. In the situation shown in FIG. 3 the write spot is present above an unwritten portion and in a position where a subsequent information area can be written. The information track is read at a later stage by means of the read spot $V_r$, which is shown at the left in FIG. 3 for the sake of clarity, but in reality the spots $V_r$ and $V_w$ coincide.

In the conventional method of magneto-optical information storage each information bit is fixed in a separate magnetic domain and each domain must be detected separately. The minimum dimensions of the magnetic domains, and hence the maximum information density, is therefore determined by the size of the diffraction-limited scanning spot. As already noted in the opening paragraph, it is not really possible in practice to increase the information density by reducing the scanning spot. According to the present invention the information density is increased while using a scanning spot of the conventional size by writing magnetic domains having a different number of sub-domains. The information is now recorded in the form of different magnetization ratios which become manifest as different grey levels during reading. The sub-domains cannot be observed separately because their size is much smaller than the size of the scanning spot and because they have a frequency which is considerably larger than the so-called optical cut-off frequency of the read apparatus.

The significance of optical cut-off frequency of a magneto-optical apparatus and the relation between the size of the information areas and the optical cut-off frequency can be explained in the simplest manner by considering the magnetic domains as a structure of areas which alternately transmit and do not transmit radiation in the case of reading by transmission, or as a structure of areas which alternately reflect and do not reflect in the case of reading by reflection. This is allowed because the polarization rotation caused by the magnetic domains, in combination with the use of polarization detection means in the apparatus, results in an amplitude modulation of the read beam.

The structure of the recorded information areas can be considered as a two-dimensional diffraction grating which splits the incident scanning beam into a non-diffracted zero-order sub-beam, a plurality of first-order sub-beams and a plurality of higher order sub-beams. For reading, only the zero-order and first-order sub-beams reflected in the tangential direction are important because the higher order sub-beams have only a small energy.

Figure 4A:
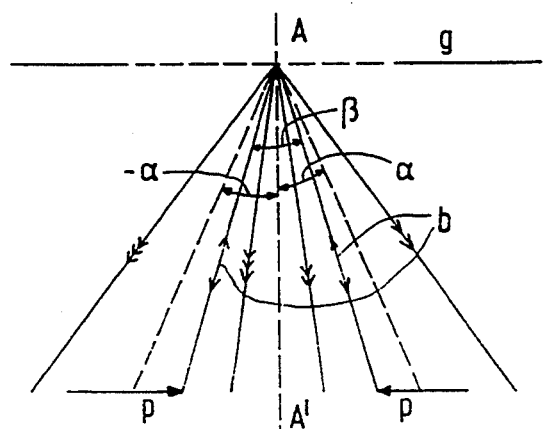
FIGS. 4a and 4b show diagrammatically the principle of optical diffraction reading.
Figure 4B:
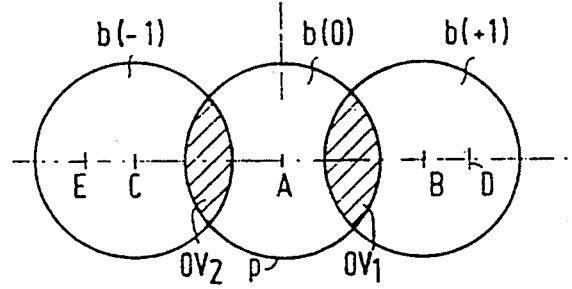

FIGS. 4a and 4b show a linear grating g in cross-section. This grating is illuminated by means of a beam b from an objective of which only the pupil p is shown. The grating g reflects the beam and splits it into a zero-order sub-beam b(0), a +1 order sub-beam b(+1), a −1 order sub-beam b(−1) and a plurality of higher order sub-beams which are not shown. The sub-beams b(+1) and b(−1) are deflected at angles of +α and −α, respectively. FIG. 4b shows the cross-sections of the beams at the location of the pupil.

The sub-beam b(0) has the same aperture angle β and the same direction as the incident beam b and falls entirely within the pupil. It passed on to a detector (18 in FIG. 1) in the case of an optical scanning apparatus which reads the information grating g. The zero-order sub-beam does not comprise any information about the succession of the information areas and intermediate areas. This information is particularly present in the first-order sub-beams b(+1), b(−1). Only the portions denoted by the hatched areas $OV_1$ and $OV_2$ in FIG. 4b the first-order sub-beams overlap the zero-order sub-beams and interferences occur. When moving the scanning spot across an information track, the phases of the first-order sub-beams change. As a result, the intensity of the total radiation passing through the objective and reaching the detector changes.

If the center of the scanning spot coincides with the phase difference $\Psi$ between the first-order sub-beam and the zero-order sub-beam. This phase difference is also referred to as phase depth of the information structure. If the scanning spot moves from a first information area to a second information area, the phase of the +1 order sub-beam increases and becomes $2\pi$ at the moment when the center of the scanning spot has reached the second information area. The phase of the −1 order beam decreases. The phases of the first-order sub-beams with respect to those of the zero-order sub-beam can thus be represented as $$\phi(+1) = \psi + 2\pi \frac{x}{P_t}$$

$$\phi(-1) = \psi - 2\pi \frac{x}{P_t}$$

in which x is the position in the tangential direction of the scanning spot and $P_t$ is the local tangential period of the information structure. The electric output signals of two detectors arranged behind the areas of transition $OV_1$ and $OV_2$ can then be represented by $$S_1 = \cos\left(\psi + 2\pi \frac{x}{P_t}\right)$$

$$S_2 = \cos\left(\psi - 2\pi \frac{x}{P_t}\right)$$

By adding these detector signals, the information signal $S_1$ is obtained:

$$S_1 = S_1 + S_2 = 2 \cdot \cos\psi \cos 2\pi \frac{x}{P_t}$$

The above applies only as long as there is overlap between the sub-beams b(+1) and b(−1) on the one hand and the sub-beam b(0) on the other hand. The angle α at which the first order sub beam is deflected is given by $$\sin \alpha = \frac{\lambda}{P_t} = \lambda \cdot f_r$$

in which $f_r$ is the spatial frequency of the grating g or the local spatial frequency of the information structure. There is no overlap if $\alpha = 2\beta$. Since $\sin \beta = NA$, the optical cut-off frequency $f_c$ is given by:

$$f_{CO} = 2 \frac{NA}{\lambda}$$

Information areas which have a spatial frequency such that $\alpha > 2\beta$, can no longer be detected separately, so that the information can no longer be read if it is coded in the frequency of these areas.

However, if, as proposed in the present invention, use is made of sub-domains having such a high frequency that only the zero-order beam passes through the read objective and the signal value of the information signal is coded in the number of sub-domains per domain, this information can be read. The fact is then utilized such that at any moment the amplitude of the zero-order beam is determined by the number of sub-domains present under the read spot at that moment. The magnetic domain structure is now observed, as it were, as a structure of areas having different grey hues, with each grey hue corresponding to a given magnetization ratio, i.e. the quotient of the total surface of the areas having a first direction of magnetization and the total surface of the areas having a second opposite direction of magnetization within the area which is covered by the scanning spot.

According to the invention the sub-domains are formed by means of an effect which has hitherto not been used in magneto-optical recording. Namely, that in a heated portion of a magneto-optical layer which is premagnetized in a given direction, application of an external magnetic field which is not sufficiently strong to magnetize the entire area in a direction opposite to that of the pre-magnetization will nevertheless form sub-areas which are magnetized in the said opposite direction. This effect even occurs up to a given negative strength of the external magnetic field. Negative strength is understood to mean that the external magnetic field has the same direction as that of the premagnetization.

As described in the article "Magneto-optic recording materials with direct overwrite capability" in "Applied Physics Letters", 49 (8), 25 Aug. 1986, pages 473–474, in a thin film of an amorphous ferri-magnetic rare earth metal compound such as GdTeFe, TbCo or TbFeCo whose compensation temperature is slightly above the ambient or room temperature, which film is premagnetized in a given direction, an area having an opposite direction of magnetization can be formed by means of irradiation with a laser beam even without the presence of an external magnetic field. Since the area under the laser spot is heated above the compensation temperature, the coercive force in this area is greatly reduced. A demagnetizing field then locally occurs in a direction which is opposite to that of the premagnetization and when the area cools down this demagnetization field becomes frozen, as it was, into the layer.

In the afore-mentioned article mention is only made of domains of the order of magnitude of 1 μm and no mention is made of considerably smaller sub-domains, nor of the consequences of the use of external magnetic fields with different strengths, both positive and negative.

Experiments performed by the Applicants have surprisingly proved that the use of external magnetic fields with field strengths which are smaller than those hitherto used, and which may even be negative, lead to the formation of sub-domains in the irradiated area, which domains are considerably smaller than the conventional domains, and that the number of sub-domains increases with an increasing external magnetic field strength until a full domain is formed. This phenomenon, which may be partly explained by means of the theory described in the above-mentioned article in "Applied Physics Letters" 49 (8) pages 473–474, is illustrated in FIGS. 5a–5d.

In these Figures the magnetic information layer 3 is shown in a cross-section. The solid-line arrows $M_1$ indicate the direction of premagnetization and the broken-line arrows $M_2$ indicate the direction of magnetization which is obtained upon heating and with an external magnetic field is present and in which the laser beam is switched off or has only a low intensity. The portion of the magnetic layer shown is then completely magnetized in the direction $M_1$.

Figure 5:
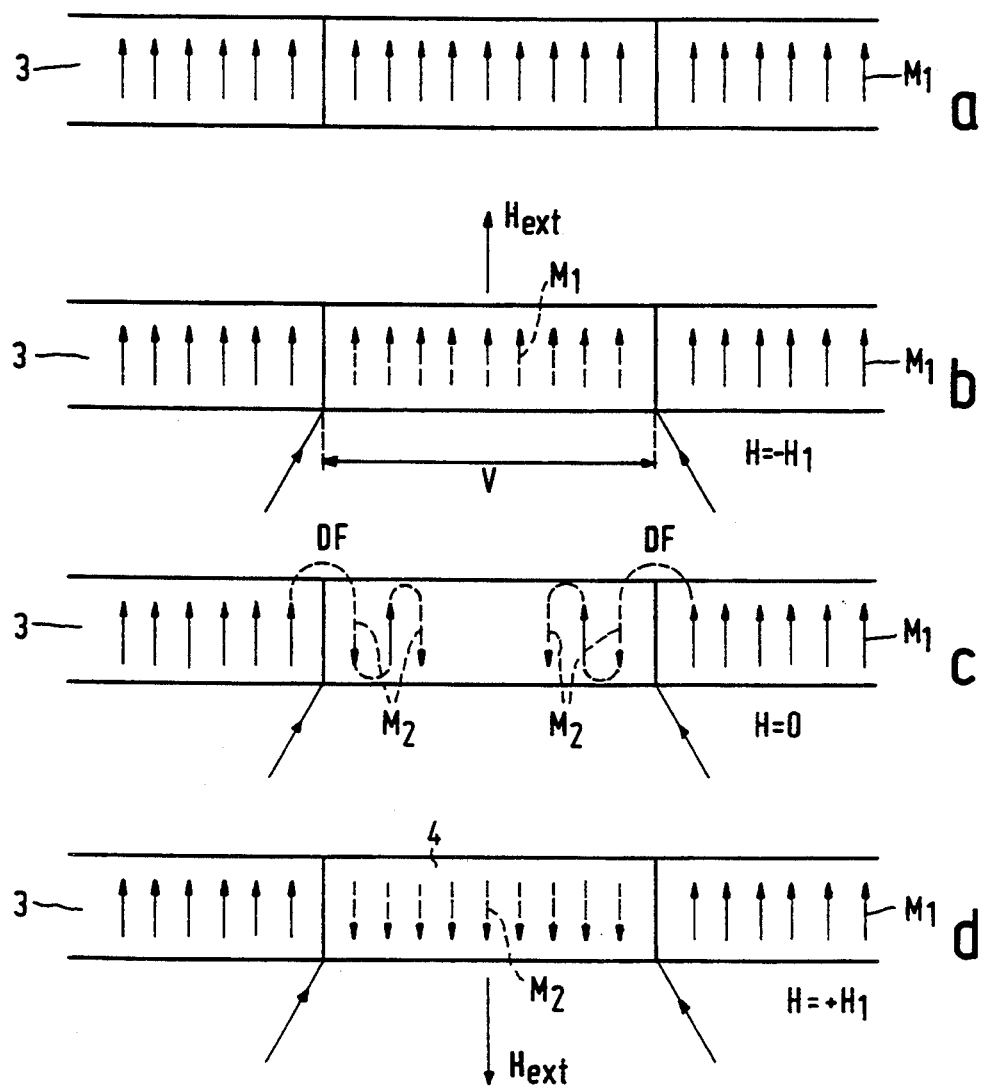
FIGS. 5a–5d show the principle of writing different grey levels by means of an amplitude-modulated magnetic field.

FIG. 5b shows the situation in which the laser beam has write intensity. The irradiated area V is then heated above the Curie point. The material in the area V then becomes paramagnetic, i.e. it has in principle no preference for a given direction of magnetization. If, as is shown in FIG. 5b, a strong negative magnetic field $H = -H_1$ is present, the area V remains magnetized in the original direction $M_1$.

If, as shown in FIG. 5c, there is no external magnetic field (H=0), the influence of the so-called demagnetizing field, also referred to as the internal field, is predominant in the information layer. This demagnetizing field DF, which originates from the ambiance of the irradiated area, ensures that within the irradiated area sub-areas are magnetized in the direction $M_2$. In their turn these sub-areas produce demagnetizing fields which, within the irradiated area, magnetize further areas in the direction $M_2$ and so forth. The formation of the sub-areas, or sub-domains, having magnetization $M_2$ starts where the cooling begins, thus at the edge of the irradiated area in the case of 5c. If writing is effected by means of a continuous radiation beam and magnetic field modulation, the formation of the sub-domains with magnetization $M_2$ trails the displacement of the radiation spot. However, if magnetic field modulation with a pulsed radiation beam is used, the formation of said sub-domains takes place from the edge of the irradiated area towards its center.

If a positive external magnetic field is applied, more sub-domains are produced, while the number of sub-domains becomes larger as the external magnetic field becomes stronger. At a given field strength $H = +H_1$, the entire area V becomes magnetized in the direction $M_2$ and the conventional domain 4 is produced again.

The demagnetizing field is capable of forming sub-domains with magnetization direction $M_2$ even when a negative external magnetic field is applied, as long as the demagnetizing field is larger than the external field.

The number of sub-domains is then also proportional to the strength of the external field.

FIGS. 6a–6e are plan views of the magnetic domains formed at different strengths of the external magnetic field. The domains of FIGS. 6a, 6c and 6e are produced under the circumstances indicated in FIGS. 5b, 5c and 5d, respectively. The domains of FIGS. 6b and 6d are produced when a respective negative and positive field strength $H_2$ is applied which is larger than zero and smaller than $H_1$. The sub-domains are shown as black areas 4'.

When an external magnetic field of the strength $H = -H_1$ is applied, no sub-domains are written (FIG. 6a). The relevant area of the information layer, or the imaginary domain $4_0$, may be characterized as a white domain. If the external magnetic field has the strength $H = -H_2$, a small number of sub-domains is formed (FIG. 6b). The domain $4_1$ may be indicated as light grey. If the strength of the magnetic field has been reduced to zero, or in other words, if there is no external magnetic field, approximately half of the domain is filled with sub-domains. This domain, $4_2$ in FIG. 6c, behaves as a medium grey area upon reading. When a positive magnetic field of the strength $H = +H_2$ is applied, approximately three quarters of the domain are filled with sub-domains (FIG. 6d). This domain $4_3$ can be considered as dark grey. A black domain 4, which is entirely filled with sub-domains, is produced when applying a magnetic field of the strength $H = +H_1$.

Figure 7:
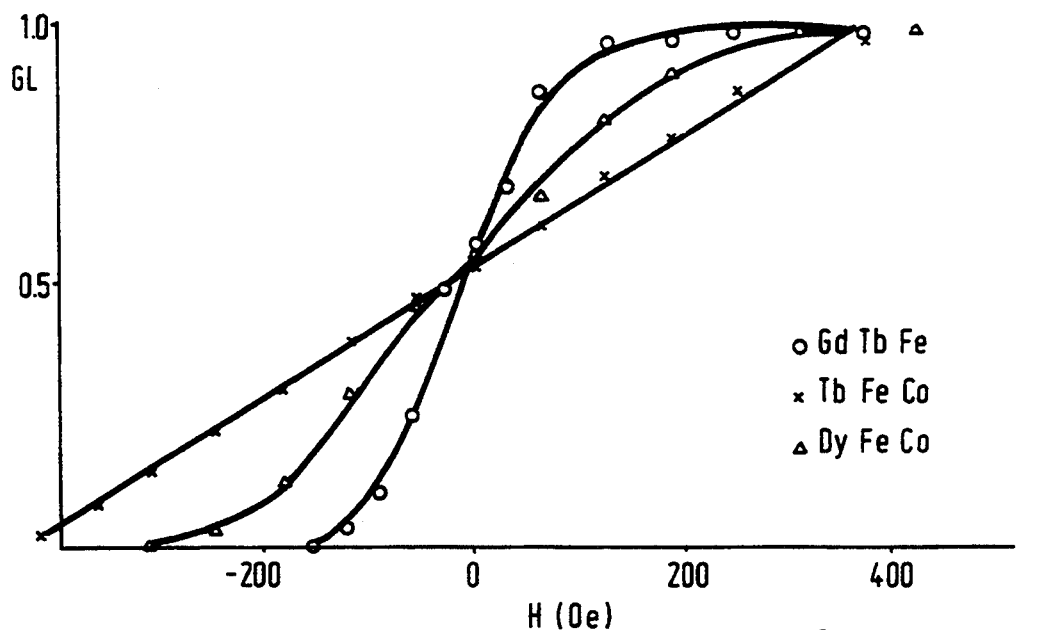
FIG. 7 shows the variation of the grey level as a function of the magnetic field strength for different materials.

The values of $H_1$ and $H_2$ and the grey levels at the different field strength depend on the composition of the magnetic information layer. FIG. 7 shows the grey levels (GL for three different alloys: GdTbFe, TbFeCo and DyFeCo as a function of the external magnetic field strength H. This Figure shows that the material TbFeCo, which has a compensation point at approximately 180° K., has a satisfactory linear relationship between the strength of the external magnetic field and the grey level. Moreover, this material has the advantage that the write noise is also small for light grey areas. It has been found that when using this material for writing information in domains having different grey levels the noise is practically equal to that produced when writing information in black domains. For the material GdTbFe, with a compensation temperature of approximately 300° K., the curve showing the variation of the grey level as a function of the external magnetic field strength has a steeper and less linear slope, while more noise occurs for the light grey areas. However, this material is in principle suitable for writing different grey levels. However, preferred are TbFeCo or DyFeCo, which has a compensation temperature below 300° K., and which grey level versus magnetic field strength characteristic curve is also shown in FIG. 7.

Figure 6:
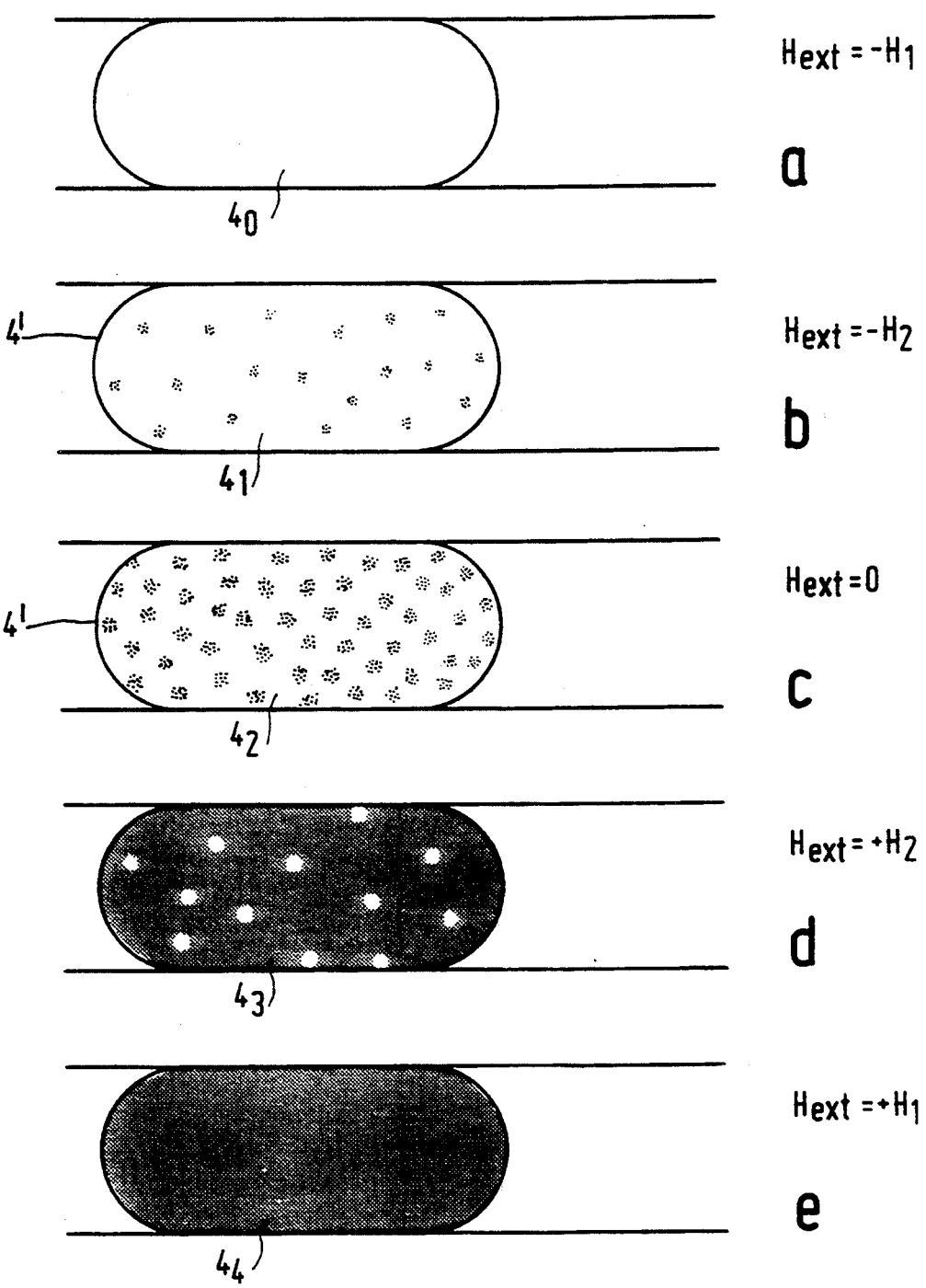
FIGS. 6a–6e shows domains with different magnetization ratios associated with the different strengths of the magnetic field.

The field strengths $H_1$ and $H_2$ of FIG. 6 are 400 Oe and 200 Oe, respectively, for the material TbFeCo.

Figure 8:
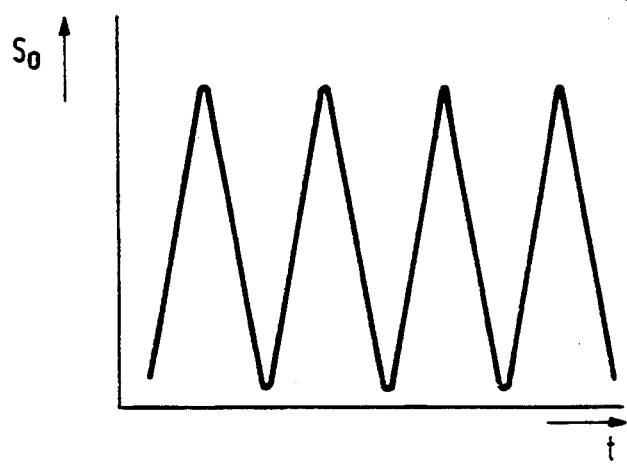
FIG. 8 shows the signal which has been read from a record carrier in which a triangular signal is written in an analog form.

As a further illustration of the possibility provided by the present invention, FIG. 8 shows the output signal $S_o$ of the detection system 18 in FIG. 1 when reading a magneto-optical record carrier in which a triangular signal $S_i$ is written in an analog form while using the method according to the present invention. It may be stated by way of example that the speed of the scanning spot with respect to the record carrier 3.75 m/sec, the size of the sub-domains is of the order of 0.1 μm and the period of the shown triangular signal which has been read is of the order of 10 μm, and that the strength of the magnetic field is modulated between −300 Oe and +300 Oe.

Figure 9:
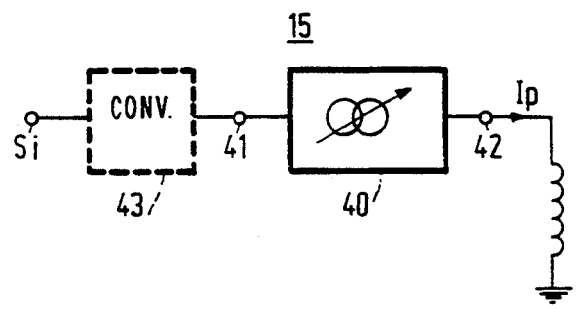
FIG. 9 shows a first embodiment of an energizing circuit.

The write-read apparatus must be provided with a special energizing circuit for writing information in different grey levels. FIG. 9 shows a first embodiment of such a circuit 15 which is suitable for writing an analog input signal in an analog manner. The circuit comprises a controllable current source 40 whose input 41 receives the analog input signal Si and whose output 42 is connected to the coil 13 for supplying a modulated energizing current to this coil.

If the signal Si to be written is not an analog but a digital signal, this signal is firstly converted into an analog signal by a converter 43.

When a signal is recorded in an analog form, it is in principle not necessary to form separate magnetic domains, but a continuous magnetic track can be written whose magnetization ratio continuously varies in accordance with the signal Si. The write-radiation beam must then have a constant and high intensity so that all areas of the track are successively heated sufficiently. The magnetic field is then sufficiently strong at any moment, between −300 Oe and +300 Oe in the given example of TbFeCo, so as to be able to give the entire track the magnetization direction $M_2$ with the desired magnetization ratio.

Figure 10:
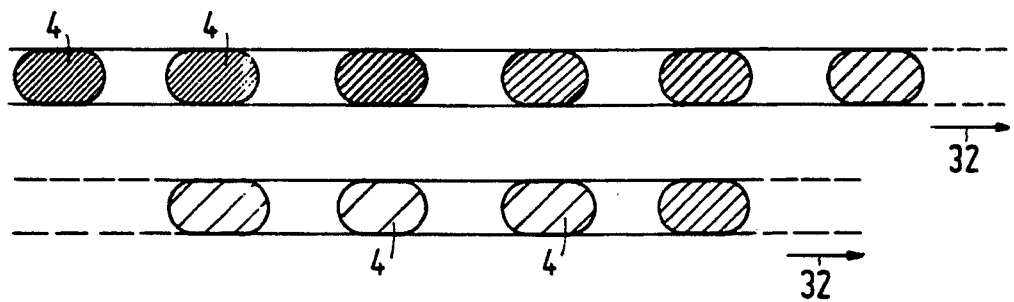
FIG. 10 shows a pattern of discrete domains in which a signal is stored in an analog form and in which the hatch density represents the magnetization ratio.

A signal in an analog form may also be recorded in discrete magnetic domains which are separated from each other by intermediate areas having the original direction of magnetization. Such domains can be formed by square-wave switching of intensity of the radiation beam between a low level and a high level by means of a laser modulation circuit, 16 in FIG. 1, whereby magnetic domains are formed only at those moments, and hence at corresponding positions along a track to be written, when the radiation beam has the high intensity. The energizing circuit of FIG. 9 may then be used whereby the analog energizing current Ip, and hence the magnetic field are sampled, as it were. A domain pattern as shown in FIG. 10 is then produced, in which the number of hatched lines of a shaded area represents the greyness or degree of magnetization of said area or domain. FIG. 10 shows the domains 4 of one track portion in two rows, which is due to lack of space in the longitudinal direction, but in reality the domains of the second row are a continuation of those of the first row. Moreover, FIG. 10 only shows a small number of domains and thus also a small number of grey levels. However, the domains may have any grey level between white and black at this analog writing of the information level.

Instead of being written in an analog form, a signal may also be written in a digital form, namely in a discrete number of grey levels, which number is larger than two, at which a higher order, for example octal, coding is used. The amplitude of the energizing current is varied in n discrete steps, with n corresponding to the number of values of the coding.

The successive magnetic domains with a varying magnetization ratio in the scanning direction are preferably contiguous with each other so that there are no intermediate areas. This situation is shown symbolically in FIG. 11 for an octal coding by which the number of hatched lines of the shaded areas again indicates given magnetization ratios or grey levels.

Figure 11:
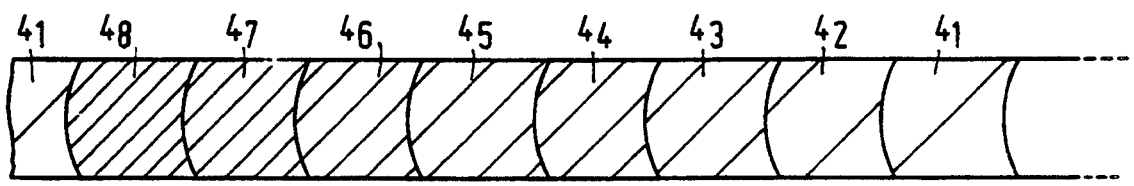
FIG. 11 shows a pattern of contiguous magnetic domains with an octal grey coding.

For writing the domain pattern of FIG. 11 a circuit such as that of FIG. 9 can be used, in which the converter 43 is of the type converting an analog or binary input signal $S_i$ into a signal having a plurality of, for example, four or eight signal levels.

Figure 12:
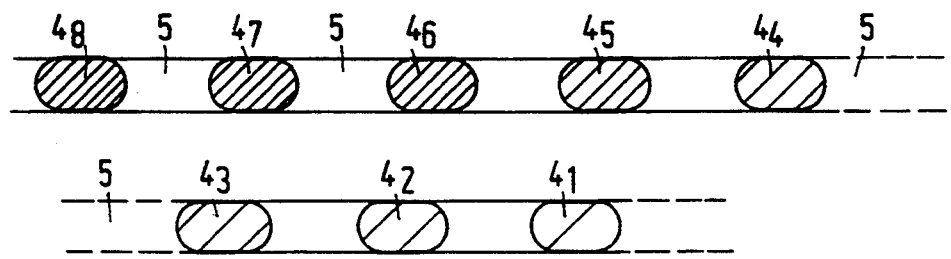
FIG. 12 shows a pattern of separated magnetic domains with an octal grey coding.

Instead of being written in a domain pattern of contiguous domains having the same direction of magnetization, a signal having a plurality of levels may alternatively be coded in a pattern of individual domains which are separated from each other by intermediate areas, or intermediate domains, having an opposite direction of magnetization. FIG. 12 symbolically shows such a pattern for an octal coding, with the information domains being denoted by $4_1 \ldots 4_8$ and the intermediate domains being denoted by 5.

Figure 13:
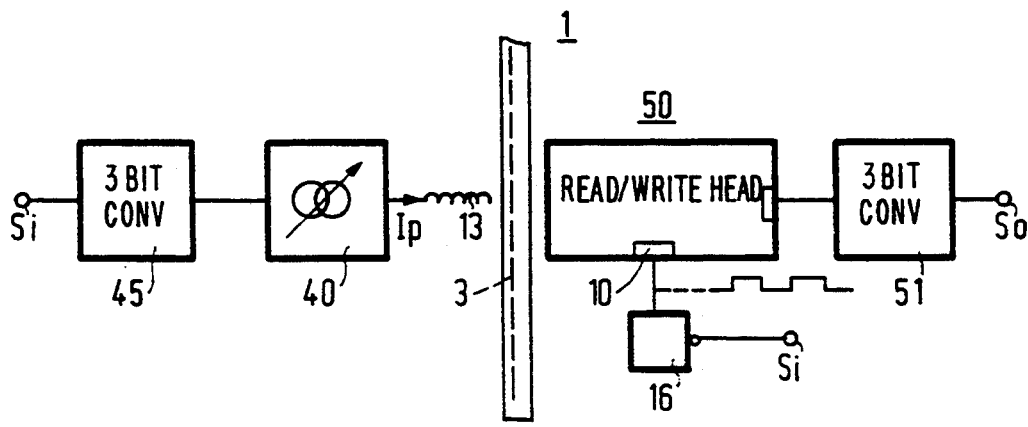
FIG. 13 shows diagrammatically an embodiment of an apparatus for writing discrete domains by means of a square-wave modulated write beam.

FIG. 13 shows the basic circuit diagram of an embodiment of an apparatus for writing and reading a domain pattern according to FIG. 2. The input signal Si, for example a binary signal, is converted by, for example, a three-bit converter 45, into a multilevel signal having, for example, eight digital signal levels, which signal is applied to a controllable current source 40. This current source supplies an energizing current to the coil 13, which current may have an amplitude at any of a plurality of values, for example eight values. The radiation source 10 in the optical write/read head 50 supplies a radiation beam whose intensity is square-wave varied at a fixed frequency by means of the modulation circuit 16 so that discrete areas of the information layer 3 are heated and the intermediate areas are not heated. Magnetic domains whose magnetization ratio, or grey level, is determined by the instantaneous value of the energizing current Ip are formed at the location of the heated areas.

The signal stored in the magnetic domains thus obtained can be regained by means of the optical head 50, which may comprise the same elements 10, 11, 12, 17, 18, 19, 20, 21, 22 and 23 as the head shown in FIG. 1. The output signal of the radiation-sensitive detector 18 (FIG. 1) is applied to a, for example, three-bit converter 51 (FIG. 13) which converts the multilevel signal having, for example, eight signal levels, into for example a binary signal So which corresponds to the signal Si.

The input signal Si may alternatively be an analog signal. The converter 45 must then be adapted to convert an analog signal into a multivalent signal, while the converter 51 must be adapted to convert the multivalent signal into an analog signal.

Instead of radiation beam modulation, the so-called magnetic field modulation is preferably used for fixing the positions of the information areas when writing information areas in the form of discrete magnetic domains. The magnetic field is alternately switched between a level above a threshold value at which domains with a first direction of magnetization are formed and a level below this threshold value at which domains with a second direction of magnetization opposite to the first direction are formed. A magnetic field is then always present, not only during writing of the information areas but also during the intermediate time intervals. It is thereby achieved that the intermediate areas always acquire a different direction of magnetization than the information areas, independent of the condition of the information layer to be written. A record carrier which has already been inscribed can then be rewritten with new information without having to erase it first. The principle of such magnetic field modulation is described in, inter alia, European Patent Application no. 0,230,325.

According to the invention the strength of the magnetic field above the said threshold value is modulated so that the magnetic domains formed with the first direction of magnetization have different degrees of magnetization, or grey levels.

Figure 14A:
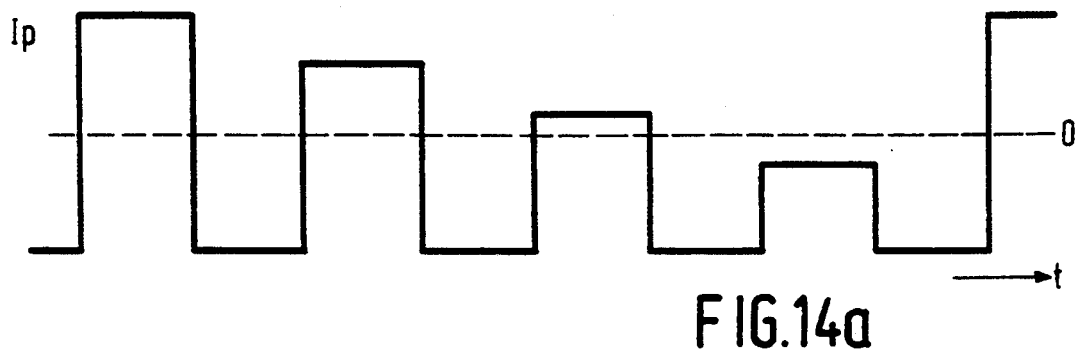
FIGS. 14a and 14b show an energizing current for writing four grey levels in discrete domains and the domain pattern written by means of this current, respectively.
Figure 14B:
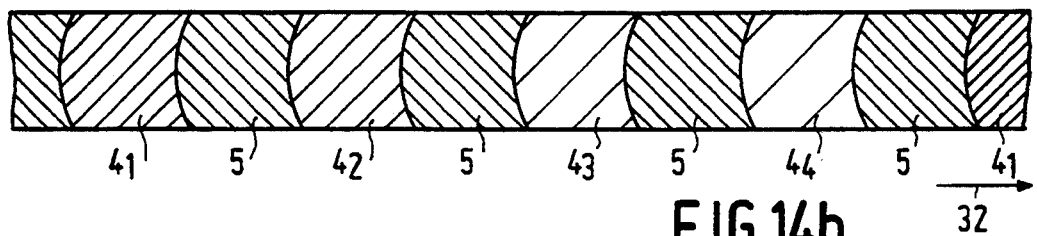

FIG. 14a shows by way of example the variation of the energizing current Ip as a function of time for a quadrivalent signal. The signal with which the controllable current source is controlled is a so-called Not Returned to Zero (NRZ) signal so that the energizing current also has an NRZ character. The zero level of this current is indicated by a broken line. FIG. 14b shows the pattern of information areas 4 and intermediate areas 5 formed by this energizing current, the different magnetization ratios of the information areas, or domains, being indicated by different numbers of hatched lines of the shaded areas.

An energizing current as shown in FIG. 14a can be directly obtained from the current source 40 by applying a control signal to this current source, which signal has a square-wave variation, alternately with a low fixed level and a higher variable level. It is alternatively possible for the input of the controllable current source to be connected to a switch which is controlled at a fixed frequency and which alternately passes the signal from the converter 45 (FIG. 13) and a negative reference signal to the current source.

When writing the information by means of magnetic field modulation, use can be made of a laser beam having a constant high intensity level. It is then ensured in the simplest manner that the material of the information layer is always locally heated to a sufficient extent to vary its direction of magnetization in dependence upon the magnetic field modulation.

A pulsed laser beam may alternatively be used, in which the laser pulses are generated with a pulse duration of, for example, 20 nsec, by a laser modulation circuit of a conventional type. An advantage of using a pulsed laser beam is that the thermal load of the information layer, and hence the rate at which the record carrier ages, is lower than in the case of writing with a radiation beam of constant intensity.

A fixed phase relation must be maintained between the instants of reversal of the energizing current and occurrence of the radiation pulses. To this end, apparatus which operates with radiation pulses and which is shown diagrammatically in FIG. 15 comprises a synchronizing circuit 60. This circuit derives control signals $S_i,1$ and $S_i,2$ of the same frequency from the information signal $S_i,1$ for the laser modulation circuit 16 and the energizing circuit 15, respectively. The energizing circuit 15 supplies a square-wave energizing current to the coil 13, the upper level of said current being modulated in accordance with the information to be written.

It is preferably ensured that the instant when a radiation pulse ends in principle coincides with the instant when the magnetic field has adjusted to its new value, so that the relevant area is written in the desired direction by means of a well-defined magnetic field and the domain formed has well-defined edges.

Figure 16:
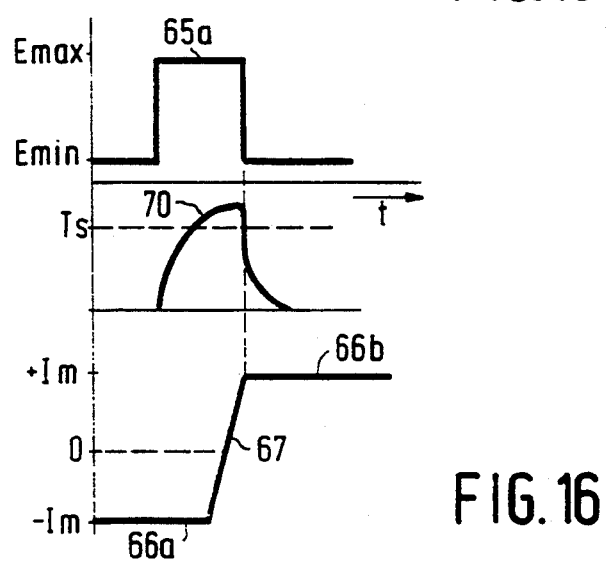
FIG. 16 shows a radiation pulse, the temperature variation caused thereby in the information layer and an energizing current pulse as a function of time.

This is illustrated in FIG. 16 in which, on a considerably larger time scale, the reference numeral 65a denotes a radiation pulse and 67 denotes a transition between a maximum negative value, $-I_m$, and, for example, a maximum positive value, $+I_m$, of the magnetic field strength.

The reference numeral 70 in FIG. 16 denotes the temperature variation as a function of time for an area of the information layer 3 irradiated by radiation pulse 65a. As a result of the supplied radiation energy, the temperature in this area rises rapidly above the write temperature Ts, which indicates the temperature above which the direction of magnetization of the recording layer can be changed by the generated magnetic field. The write temperature Ts is generally above the compensation temperature of the material of the information layer.

After the end of the radiation pulse 65a the material cools down very rapidly to approximately its ambient temperature due to the transport of heat in the information layer 3.

Figure 17:
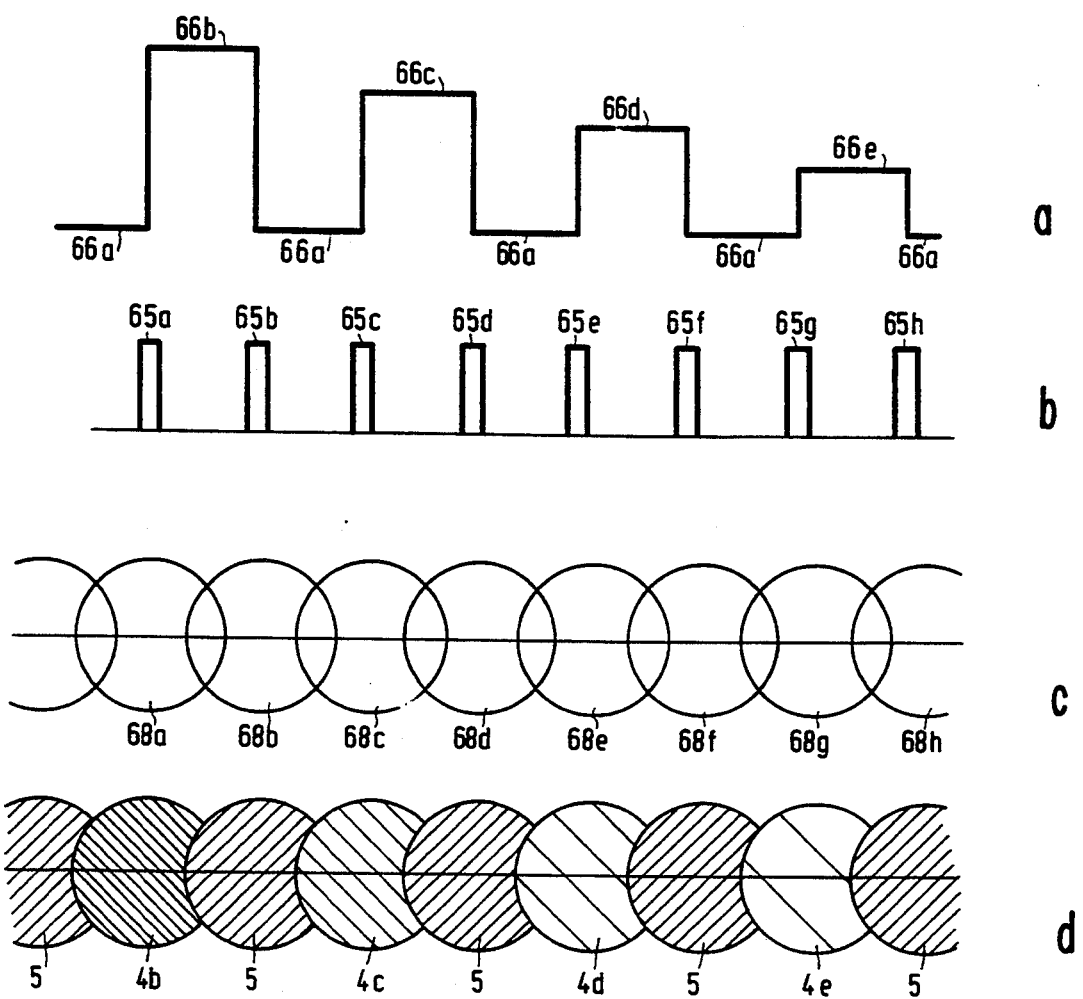
FIGS. 17a–d shows the variation of the energizing current and the write beam intensity in the apparatus according to FIG. 15, and the domain pattern obtained.

The duration of the radiation pulse 65a and the phase relation between this pulse and the point of reversal from level 66a to level 66b of the energizing current are chosen to be such that the information layer cools down at the instant the positive value $+I_m=66b$ of the energizing current is reached, so that the area 68a (see FIG. 17) is magnetized in the direction associated with this value and an information area 4b is produced with the magnetization ratio associated with the value $+I_m$ as is illustrated in FIG. 17.

After some time, which is determined by the information signal to be written, the energizing current again changes sign (level 66a). At that moment a second radiation pulse 65b, which has heated an area 68b of the information layer, ends. The area 68b is thereby magnetized in a direction which is opposite to that in which the area 68a was magnetized and a magnetic domain or intermediate area 5 is produced. Subsequently the energizing current is adjusted to the level 66c at which an information area 4c with a lower magnetization ratio, or grey level, is written. By successively adjusting the energizing current to the levels 66c, 66d, 66e, etc., and supplying the associated radiation pulses 65d . . . 65g, the information areas 4d and 4e with a decreasing magnetization ratio and the intermediate areas 5 are written.

It will be evident that the influence of variations of the write sensitivity on the accuracy with which the boundary of the magnetic domain formed is positioned is smaller as the temperature gradient in the boundary region is larger.

It is to be noted that the temperature gradient increases as the required energy is supplied to the information layer within a shorter time. It is advantageous to choose the length of the radiation pulses to be small with respect to the repetition period.

Figure 15:
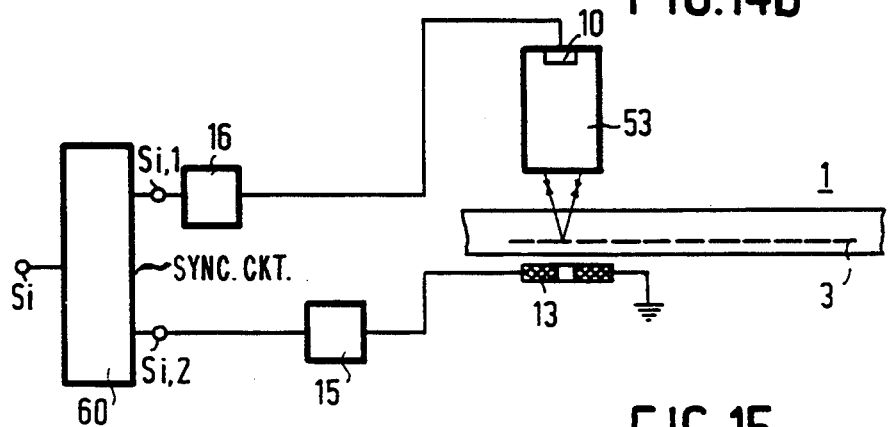
FIG. 15 shows the basic circuit diagram of an apparatus in which magnetic field modulation and a pulsed write beam are used.
Figure 18:
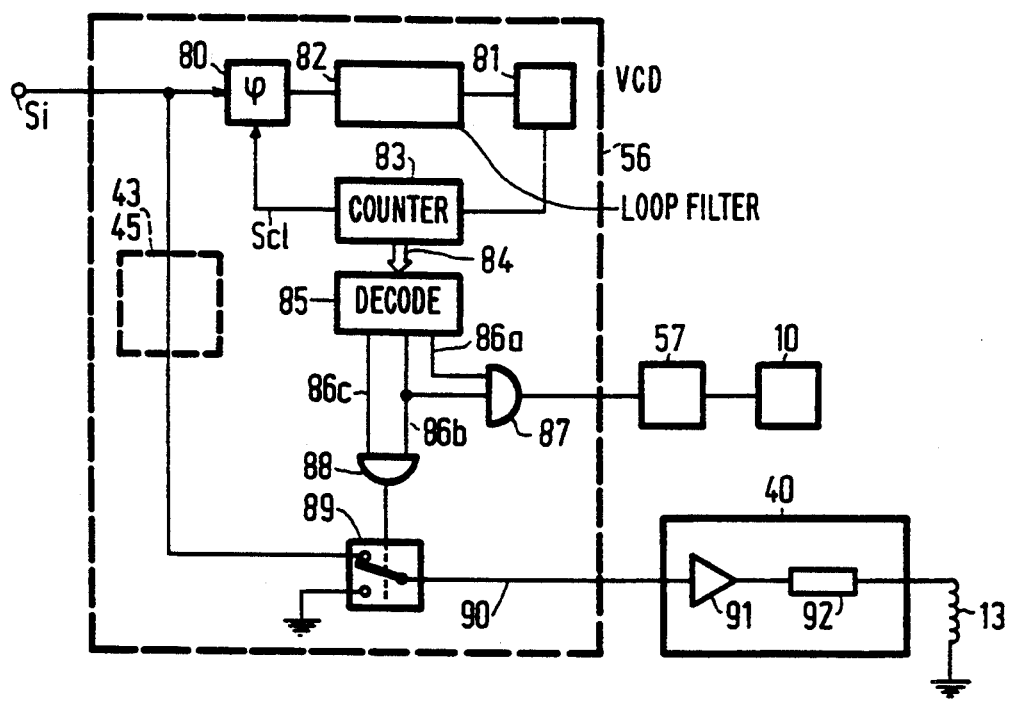
FIG. 18 shows an embodiment of a synchronizing circuit for use in the apparatus according to FIG. 15.

FIG. 18 shows an embodiment of the synchronizing circuit 60 in FIG. 15 which is suitable for controlling the recording of a digital information signal $S_i$ at a given bit frequency, for example, an NRZ-modulated signal. The synchronizing circuit shown in FIG. 18 comprises a circuit for regaining a channel clock signal $S_{Cl}$ having the same frequency as the bit frequency of the information signal $S_i$. Such a circuit may comprise a phase detector 80 of a conventional type, which at each zero crossing of the information signal $S_i$ determines the phase difference between this zero crossing and the clock signal $S_{Cl}$. The phase detector 80 applies a signal, which is indicative of the given phase difference, to a voltage-controlled oscillator 81 via a loop filter 82. The oscillator generates a periodic signal at a frequency which is an integral multiple of the channel clock signal $S_{Cl}$, from which periodic signal the channel clock signal $S_{Cl}$ is derived by frequency division performed by a counter 83. The phase detector 80, the loop filter 82, the voltage-controlled oscillator 81 and the counter 83 constitute a phase-locked loop circuit of a conventional type.

The count of counter 83 is applied via a bus 84 to the decoding circuit 85 which generates three logic "1" signals 86a, 86b and 86c when three respective successive counts are reached. The signals 86a and 86b are applied to the inputs of a dual-port AND gate 87. The output signal of AND gate 87 is applied to the laser modulation circuit 57 which in response to each pulse of the output signal of AND gate 87 generates a pulsatory control signal for the laser 10. The signals 86b and 86c are applied to a dual-port AND gate 88. The output signal of AND gate 88 serves as a control signal for an electronic switch 89. The information signal $S_i$ is applied to a first input of the switch 89, while a second input of the switch 89 is connected to ground potential. The electronic switch 89 connects the output of the switch 87 to the first or the second input of the switch 89, dependent on the logic value of the control signal from AND gate 88. The signal 90 thus obtained at the output of switch 89 is a square-wave signal having a frequency which is equal to the bit frequency of the signal $S_i$, while the polarity is determined by the instantaneous polarity of the information signal $S_i$. The signal 90 is applied to the energizing circuit 40. As an alternative to a controllable current source, this energizing circuit comprises a powder amplifier 91 which generates a voltage which is proportional to the input voltage of the amplifier 91. The output of the amplifier 91 is connected to the coil 13 via a resistor 92, which resistor 92 functions as a limiting resistor for the energizing current. The resistance of resistor 92 and the inductance of the coil 13 are adapted to each other in such a way that the time constant of the RL circuit formed is small with respect to the pulse width of the energizing current pulse.

It is to be noted that the blocks of energizing current are converted in the synchronizing circuit of FIG. 18 into a number of energizing current pulses per block, so that the dissipation in the energizing coil, the coil core and the electronic control equipment is reduced.

Instead of the controllable current source 40 shown in FIG. 9 or the power amplifier 91 shown in FIG. 18, which amplifier must supply a high output voltage, one may make use of the magnetic field modulator in the write-read apparatus which is described in European Patent Application no. 0,312,143 and which operates at a considerably lower voltage. This magnetic field modulator has an input for receiving a bivalent control signal, a magnet coil for generating a magnetic field, switching means for coupling, in dependence upon the logic value of the control signal, at least one connection terminal of the magnet coil to a first potential point having a first potential or to a second potential point having a second potential in order to generate an alternating current in the magnet coil, which current has a polarity determined by the logic value of the control signal, and in which the magnet coil is incorporated in a parallel resonant circuit. The switching means are provided with means for blocking, after decoupling the connection terminal from one of the potential points, the coupling with the other potential point during a time interval which substantially corresponds to half the resonance time of the resonant circuit. This modulation has been designed for writing first and second magnetic domains having opposite directions of magnetization, the first domains all being completely magnetized and thus having a constant and maximum magnetization ratio. The second domains constitute intermediate areas.

In accordance with a further aspect of the present invention the aforesaid magnetic field modulator may also be used in an apparatus for writing magnetic information domains having a plurality of magnetization ratios or grey levels. To this end the device may be provided with a plurality of these magnetic field modulators, which plurality is determined by the number of grey levels to be written. If four grey levels must be written, two magnet coils are required, ensuring that the absolute value of the magnetic field strength $MFS_1$ of the one coil is twice as large as that, $MFS_2$ of the other coil. Since the total magnetic field strength $MFS_t$ is equal to $MFS_1 + MFS_2$ and the magnetic field of each coil can be switched between positive and negative, the total magnetic field may assume the following four values:

$$MFS_t = +MFS_1 + MFS_2 = +3MFS_2$$
$$MFS_1 - MFS_2 = +MFS_2$$
$$-MFS_1 + MFS_2 = -MFS_2$$
$$-MFS_1 - MFS_2 = -3MFS_2$$

It will be evident that three coils are required for writing eight grey levels, four coils are required for writing sixteen grey levels, etc.

It is of course not necessary to use magnetic field modulators according to European Patent Application 0,312,143 when using a plurality of coils in the write-read apparatus. It is alternatively possible to use other types of coil energizing circuits.

When using two magnetic field coils, these are preferably arranged on both sides of the record carrier. If one of the coils has a transparent core, for example an air-cored coil, the objective lens may be secured to this coil in such a way that the scanning beam is focused on the information layer via the transparent core of the coil.

Figure 19:
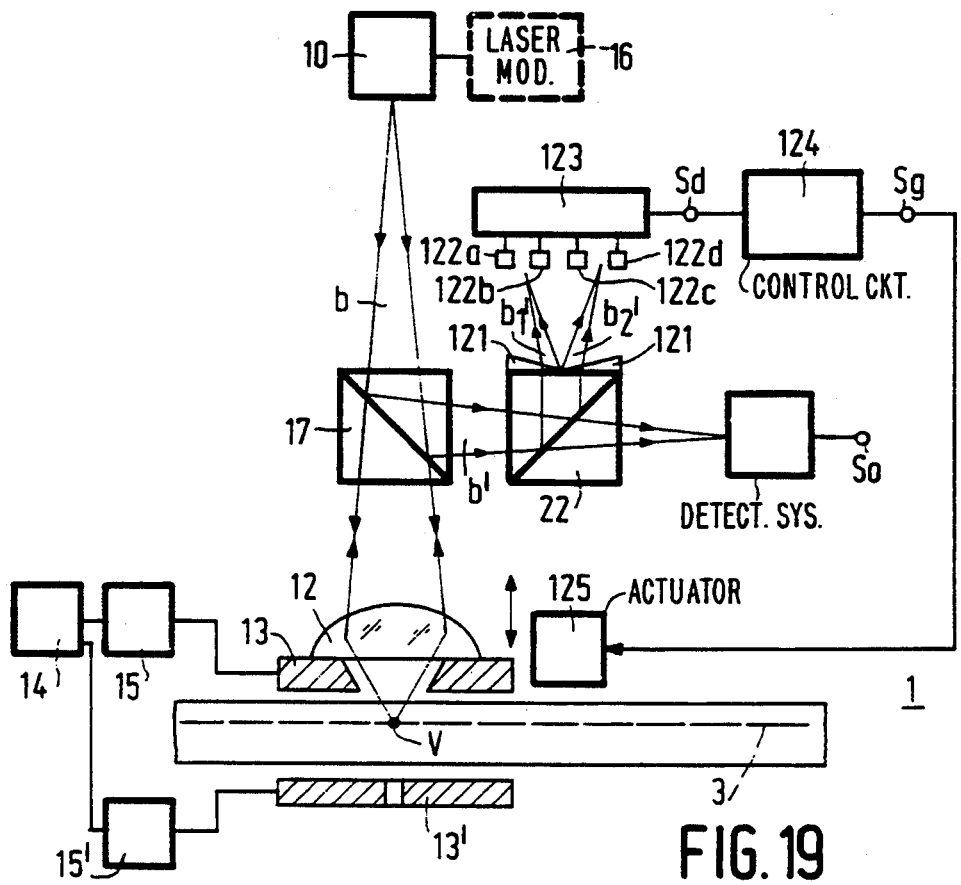
FIG. 19 shows an embodiment of a write-read apparatus with two coils.

FIG. 19 shows an embodiment of an apparatus including two coils, utilizing this possibility. In this Figure the components corresponding to the components shown in FIG. 1 have the same reference numerals. The recording apparatus shown in FIG. 19 has a focusing control of a conventional type, comprising the objective lens 12, the partly transmissive prism 17, the partly transmissive prism 22, a roof prism 121, a system of, for example, four radiation-sensitive detectors 122a, 122b, 122c and 122d, a circuit 123, a control circuit 124 and an actuator 125. The beam b' reflected by the information layer 3 is passed to the roof prism 121 by means of the prisms 17 and 22. This prism 121 splits the beam b' into two sub-beams $b_1'$ and $b_2'$ which are each incident on a separate pair of detectors 122a, 122b and 122c, 122d, respectively. The output signals of these detectors are applied to the circuit 123 in which the difference between the sum of the output signals of the detectors 122a and 122d and the sum of the output signals of the detectors 122b and 122c is determined. This difference signal is indicative of the degree of focusing of the scanning beam b on the information plane 3. The difference signal $S_d$ is applied to the control circuit 124 which generates such a control signal $S_f$ for the actuator 125 that the actuator 125 keeps the radiation beam b focused on the information layer 3 by way of movement of the lens 12, which means that the distance between the lens 12 and information layer 3 is maintained constant. The distance between the coil 13 and the information layer is also maintained constant. The second coil 13' is present under the record carrier and is controlled by a second energizing circuit 15' which, likewise as the energizing circuit 15 for the coil 13, is controlled from a control circuit 14. This circuit ensures that the two coils are energized in a mutually coordinated manner.

If three coils must be used, for example, the coil 13' may be replaced by two coils whose axes extend at, for example, opposite angles to a normal on the information plane, for example, the optical axis of the system.

We claim:

1. A method of writing an information signal on a record carrier having a magneto-optical recording layer, comprising the steps of:
   (i) scanning the recording layer with an optical scanning beam which is focused to a scanning spot thereon which successively scans successive local areas thereof;
   (ii) controlling the intensity of the scanning beam so that during scanning of a local area the scanning beam heats said local area above a write temperature;
   (iii) supplying an energizing current to a coil so as to cause the coil to generate a magnetic field to which a scanned local area is subjected during scanning thereof, the magnetic field being directed substantially perpendicular to the recording layer; and
   (iv) modulating the energizing current supplied to the coil in accordance with the information signal to be written, so that during scanning of a local area the magnetic field to which said local area is subjected writes a magnetic domain therein which includes a number of sub-domains having dimensions smaller than the scanning spot, the number of sub-domains and the magnetization ratio of the magnetic domain being as determined by the information signal.

2. A method as claimed in claim 1, further comprising prior to step (i) providing a record carrier having an information layer which is a magnetic material having a Curie temperature and also having a compensation temperature substantially lower than the Curie temperature.

3. A method as claimed in claim 1, further comprising prior to step (i) providing a record carrier having an information layer which includes an alloy of terbium, iron and cobalt.

4. A method as claimed in claim 1, further comprising prior to step (i) providing a record carrier having an information layer which is a multi-layer structure of cobalt and platinum.

5. A method as claimed in claim 1, wherein in step (iv) the modulation of the energizing current is a continuous variation of the amplitude thereof in accordance with the information signal to be written.

6. A method as claimed in claim 5, wherein the magnetic domains written in step (iv) adjoin each other in the scanning direction without interposition of intermediate areas therebetween.

7. A method as claimed in claim 5, wherein the magnetic domains written in step (iv) are separated from each other in the scanning direction by intermediate areas.

8. A method as claimed in claim 7, wherein the radiation beam is square-wave modulated so as to fix the positions of the magnetic domains which are written in step (iv).

9. A method as claimed in claim 1, wherein in step (iv) the modulation of the energizing current is a variation of the amplitude thereof in a number n of discrete steps, n being an integer greater than 2.

10. A method as claimed in claim 9, wherein the energizing current is a square-wave having a first level and a second level, the first and second levels respectively being above and below a first limit value at which the magnetic domains written in step (iv) have a first direction of magnetization; and further comprising modulating the first level of the energizing current in accordance with the information signal to be written.

11. A method as claimed in claim 10, wherein the second level of the energizing current is also below a second limit value at which the magnetic domains which are written in step (iv) have a second direction of magnetization opposite to said first direction of magnetization.

12. A method as claimed in claim 10, further comprising pulsing the intensity controlled scanning beam and maintaining a phase relationship between the square-wave energizing current and pulses of the intensity controlled scanning beam such that each pulse continues until the magnetic field produced by said coil has stabilized at a value corresponding to said modulated first level of said square-wave during said pulse.

13. A method as claimed in claim 9, wherein in step (ii) the scanning beam intensity is set to a selected constant value.

14. A method as claimed in claim 9, wherein in step (ii) the scanning beam intensity is pulsed.

15. An apparatus for writing an information signal on a magneto-optical recording layer of a record carrier, and reading from the recording layer the information signal which has been written thereon; said apparatus comprising:
a radiation source for supplying a scanning beam;
an objective system for focusing the scanning beam into a scanning spot which successively scans successive local areas of said recording layer;
coil means for generating a magnetic field in a direction perpendicular to the recording layer and subjecting each scanned local area to said magnetic field during scanning thereof;
a converter for receiving an information signal to be written and converting it into a control signal corresponding thereto;
energizing circuit means for generating energizing current for said coil means which is modulated in accordance with said control signal, whereby the magnetic field generated by said coil means is modulated in accordance with the information signal to be written; said modulated magnetic field writing magnetic domains in scanned local areas of the recording layer, the magnetic domain in any local area including a number of sub-domains having a magnetization ratio as determined by said information signal; and
a radiation sensitive detection system for detecting modulated radiation produced from scanned local areas of the recording layer and converting the detected modulated radiation into an electrical signal corresponding to the magnetization ratios of the magnetic domains which have been written in said scanned local areas.

16. An apparatus as claimed in claim 15, characterized in that the energizing circuit is adapted to supply an energizing current having an amplitude which, as unmodulated, is above a threshold value at which magnetic domains having a first direction of magnetization can be written.

17. An apparatus as claimed in claim 16, characterized in that the radiation source is adapted to supply a scanning beam having a constant write intensity during writing of the information signal to be written.

18. An apparatus as claimed in claim 15, characterized in that the radiation source is adapted to supply a scanning beam which, during writing of the information signal to be written, is square-wave modulated between a first intensity level above a threshold value at which magnetic domains are formed and a second intensity level below said threshold value.

19. An apparatus as claimed in claim 18, further comprising a synchronizing circuit for controlling said radiation source and said energizing circuit so as to maintain a predetermined phase relation between the intensity variation of the scanning beam and transitions of the energizing current between different predetermined amplitude levels thereof.

20. An apparatus as claimed in claim 15, characterized in that the energizing circuit is adapted to supply a square-wave energizing current having a first variable level above a threshold value at which magnetic domains having a first direction of magnetization and a variable magnetization ratio are written, and a second level below the threshold value.

21. An apparatus as claimed in claim 20, characterized in that the radiation source is adapted to supply a scanning beam having a constant write intensity during writing of the information signal to be written.

22. An apparatus as claimed in claim 20, characterized in that the radiation source is adapted to supply a scanning beam in the form of write pulses of radiation during writing of the information signal to be written, the duration of each pulse being considerably less than half the pulse period between pulses.

23. An apparatus as claimed in claim 22, further comprising a synchronizing circuit for controlling said radiation source and said energizing circuit so as to maintain a predetermined phase relation between the radiation pulses produced by said radiation source and the square-wave energizing current produced by said energizing circuit, said phase relation being such that the end of each radiation pulse substantially coincides with an instant at which the energizing current has completed a transition between different predetermined amplitude levels thereof.

24. An apparatus as claimed in claim 23 wherein said information signal is digital and has a given bit frequency, and further characterized in that the synchronizing circuit is adapted to maintain said phase relation by synchronizing generation of the radiation pulses and energizing current pulses with the bit frequency of the digital information signal, and in that the means for modulating the energizing current are adapted to generate energizing current pulses having a polarity which is determined by the logic value of the digital information signal.

25. An apparatus as claimed in claim 24, characterized in that it comprises an oscillator for generating a periodical signal, in that the synchronizing circuit is adapted to derive the instants of generating the radiation pulses and energizing current pulses from the periodical signal, and in that the synchronizing circuit is further provided with means for maintaining a fixed phase relation between the information signal and the periodical signal.

26. An apparatus as claimed in claim 24, characterized in that it further comprises phase-comparing means for determining the phase difference between the periodical signal and the information signal, and means for synchronizing the information signal with the periodical signal in dependence upon the phase difference.

27. An apparatus as claimed in claim 15, characterized in that said coil means comprises at least two coils arranged on both sides of the plane of said recording layer, said energizing circuit means comprises respective energizing circuits for the respective coils, and further comprising a control circuit for coordinating energizing of all said coils by said energizing circuits.

28. An apparatus as claimed in claim 27, characterized in that one of said coils has a radiation-transmissive core and said one coil is arranged so that the scanning beam is directed onto the recording layer via said core.

* * * * *